(12) United States Patent
Boyd et al.

(10) Patent No.: US 6,483,005 B1
(45) Date of Patent: Nov. 19, 2002

(54) TREATMENT OF EFFLUENTS

(75) Inventors: Victoria Jane Boyd, Warrington (GB); Ian David Hudson, Seascale (GB); Stuart Hamilton Taylor, Cardiff (GB); Shane Rory O'Leary, Oxford (GB); Graham John Hutchings, Cardiff (GB)

(73) Assignee: British Nuclear Fuels PLC (GB)

( * ) Notice: Subject to any disclaimer, the term of this patent is extended or adjusted under 35 U.S.C. 154(b) by 0 days.

(21) Appl. No.: 09/806,640

(22) PCT Filed: Oct. 5, 1999

(86) PCT No.: PCT/GB99/03287

§ 371 (c)(1),
(2), (4) Date: Jun. 25, 2001

(87) PCT Pub. No.: WO00/20342

PCT Pub. Date: Apr. 13, 2000

(30) Foreign Application Priority Data

Oct. 7, 1998 (GB) ............................................ 9821723

(51) Int. Cl.⁷ ................................................ A62D 3/00
(52) U.S. Cl. ...................... 588/205; 588/200; 588/221; 210/758; 210/759; 210/762; 210/763
(58) Field of Search ............................... 588/205, 206, 588/207, 215, 218, 221, 223, 224, 200, 202, 203; 502/300; 210/749, 758, 759, 760, 761, 762, 763

(56) References Cited

U.S. PATENT DOCUMENTS

| | | | | |
|---|---|---|---|---|
| 3,140,148 A | * | 7/1964 | Hofer et al. ...................... 23/2 |
| 4,031,149 A | * | 6/1977 | Eden ........................... 423/481 |
| 4,435,379 A | * | 3/1984 | Olson et al. ................. 423/472 |
| 6,224,841 B1 | * | 5/2001 | Taylor et al. ............. 423/245.3 |

FOREIGN PATENT DOCUMENTS

| | | |
|---|---|---|
| GB | 1194424 | 6/1970 |
| GB | 1421301 | 1/1976 |
| GB | 1506288 | 4/1978 |
| WO | WO 96/30085 | 10/1996 |

* cited by examiner

*Primary Examiner*—Stanley S. Silverman
*Assistant Examiner*—Eileen E. Nave
(74) *Attorney, Agent, or Firm*—Reising, Ethington, Barnes, Kisselle, Learman & McCulloch P.C.

(57) ABSTRACT

The present invention relates to removal of organic pollutants from aqueous effluent streams. The present invention provides a method of destructively oxidising an organic compound present in an aqueous solution, the method comprising oxidising the organic compound in the presence of a catalyst which contains uranium. The catalyst may comprise a uranium oxide. The reaction may be carried out at low temperature, e.g. ambient temperature. The method may be used to treat aqueous effluent streams to remove organic compounds from the stream.

19 Claims, No Drawings

TREATMENT OF EFFLUENTS

The present invention relates to removal of organic pollutants from aqueous effluent streams.

In many industries, eg the chemical and nuclear industries, considerable volumes of aqueous effluent are produced which require treatment to minimise the concentrations of pollutants before discharge to the environment. One class of pollutants in particular which require removal are organic compounds. One way of removing organic compounds is by oxidising the compounds, eg to $CO_2$.

Destructively oxidising organic compounds in aqueous streams can be achieved in a number of ways. Steam stripping may be used initially to remove volatile compounds from aqueous streams. The compounds may then be destroyed in the gas phase.

Although volatile compounds can be treated in this way, non-volatile compounds remain in the liquid effluent and must be treated by a different technology.

This may be achieved by processes such as non-catalytic or catalytic wet air oxidation in which the effluent is heated, eg above 200° C., under elevated pressure so that the system remains liquid. The need to maintain the effluent at high temperature and pressure is obviously undesirable. Also the typical limits on the concentration of organic compounds in solution which can be treated by the method are in the range 2–20%. Therefore, other methods must be found to treat effluents with lower concentration levels than this.

Lower temperature oxidation of organic compounds in aqueous solutions can be achieved through the use of catalysts. To date, numerous homogenous catalyst systems have been used. These have included, for example, mixtures of hydrogen peroxide and $FeCl_2$ (Fenton's reagent) or mixtures of hydrogen peroxide and chromium(VI) solutions.

However, problems can arise in such homogeneous catalyst systems. For example, since the catalyst is in the same phase as the solution, a proportion of the dissolved catalyst itself may be discharged to the environment along with the treated effluent leading to loss of valuable catalyst and accumulation of catalyst in the environment. Furthermore, although many homogeneous catalytic systems are generally efficient at organic removal at moderate concentrations, at low concentrations of pollutants, such as several ppm, their efficiency can be significantly reduced.

Heterogeneous catalysts, such as metals or metal oxides, are more commonly used to catalyse reactions of gas phase organic compounds and have been used less widely in the aqueous phase. Problems are likely to be encountered when using such catalysts to catalyse reactions in the aqueous phase. For example, such catalysts may dissolve in the aqueous solution. Also, contact between the organic compound and the catalyst may be less effective at low concentrations of the compound due to interfering effects of the water molecules. In the case of supported catalysts, the support material, such as silica or alumina, may become hydrolysed which further reduces the ability of the organic compound to contact the catalyst.

Nevertheless, titanium dioxide, $TiO_2$, has been used in the photocatalytic oxidation of organic compounds in which ultraviolet light is used to excite electrons across the band gap in $TiO_2$ and promote oxidation of the organic compound. However, the efficiency of these catalysts is low.

In view of the problems detailed above, it can be seen that the need exists for improved methods of organic destruction.

According to the present invention there is provided a method of destructively oxidising an organic compound present in an aqueous solution, the method comprising oxidising the organic compound in the presence of a catalyst which contains uranium.

Desirably, the catalyst comprises a uranium oxide with a stoichiometry from $UO_2$ to $UO_3$ inclusive. The catalyst may, for example, comprise $UO_2$, $U_3O_8$, $UO_3$ or another uranium oxide. The catalyst may comprise a mixture of two or more such uranium oxides. Preferably the catalyst comprises $U_3O_8$.

The catalyst may additionally contain one or more other metals. The one or more other metals may comprise, for example, vanadium, iron, copper or platinum.

The one or more other metals may be present as metal oxides, for example, vanadium, iron, copper or platinum oxides.

The catalyst may, for example. comprise a uranium oxide as defined above and one or more other metals. The one or more other metals may for example be vanadium, iron, copper or platinum or oxides thereof. A catalyst containing uranium and vanadium has been found to be particularly effective for destroying organic compounds in the present invention.

The catalyst may comprise a mixed metal oxide. The catalyst may comprise a mixture of single phase metal oxides.

The catalyst may comprise a mixed metal oxide which includes uranium and at least one other metal. The uranium-containing mixed metal oxide may be present with a uranium oxide and/or one or more other metals or metal oxides.

The catalyst may be supported on a support, for example, silica ($SiO_2$), alumina ($Al_2O_3$), zeolites, activated carbon, titania ($TiO_2$), zirconia ($ZrO_2$) or ceria ($CeO_2$).

The catalyst need not comprise a uranium oxide, but may comprise another uranium containing substance.

It has been found that oxides of uranium have a high catalytic activity for the oxidative decomposition of organic compounds in aqueous solutions. It has also been found that the activity may be enhanced in some cases by the incorporation of other metals or metal oxides in the catalyst. Different metals or metal oxides may have different effects on the activity of the catalyst for destroying a particular organic compound. One or more particular metals or metal oxides may be incorporated in the catalyst to enhance the destruction of any particular organic compound. Thus the composition and form of the catalyst may be tailored towards the particular organic pollutant which it is desired to destroy.

Advantageously, in the method according to the present invention, the catalyst does not dissolve in the aqueous solution. Since the integrity of the catalyst is maintained throughout the reaction, the catalytic activity is likewise maintained and fresh catalyst is not required to be added frequently. Also, the problems in homogeneous catalytic systems related to dissolved catalyst being washed away with the effluent are minimised.

The method according to the present invention is also highly efficient. It has been found that in excess of 99.9% of an organic compound in an aqueous effluent may be destroyed.

The organic compound may be present in a concentration above or below its solubility limit in water.

In contrast to some prior art methods of destroying organic compounds, the oxidation reaction in the present invention may be carried out at relatively low temperatures. The reaction may be carried out below 100° C. Preferably the reaction is carried out below 50° C. to avoid the problems associated with heating large volumes of water.

The inventors have found that the reaction is efficient even when carried out at ambient temperature. Since the cost of heating large volumes of effluent can be very high in practice, the high efficiency of the method according to the present invention at ambient temperatures provides a significant advantage for industrial scale applications.

The oxidant employed in the reaction may be a commonly used oxidant such as hydrogen peroxide. The inventors have also found that air or oxygen is an efficient oxidant in the present invention. Both hydrogen peroxide and air have the advantage that they decompose to environmentally benign products. It is envisaged that many other oxidants may be used equally. For example, $KMnO_4$ or ozone may be used. Other oxidants such as $H_2O_2$ and sodium hypochlorite mixtures, sodium peroxydisulphate and calcium hypochlorite may be efficient oxidants but may present their own environmental hazards and for that reason may be less favoured.

It will be appreciated immediately that the ease and low cost of being able to use air as an oxidant and operate at ambient temperature represents a considerable advantage.

The invention may be carried out as either a batch or continuous flow process.

The types of organic compounds which may be destroyed in the method according to the present invention include alkanes, alkenes, alkynes, aromatics, alcohols, aldehydes, ketones, carboxylic acids, esters, ethers, amines, detergents, organophosphates and derivatives of all these including compounds containing substituent groups and heteroatoms. In particular, the inventors have found that alkyl phosphates such as tributyl phosphate (TBP), sodium di-butylphosphate (NaDBP) and hydrogen monobutyl phosphate (HMPB) are efficiently destroyed. It should be understood that the foregoing list is not exhaustive and does not limit the invention in any way. In principle, all types of organic compound may be destroyed by the method according to the present invention. Several different organic compounds present in the same aqueous effluent may be treated together.

Particular industries each have their own array of problem compounds to deal with. The present invention is potentially applicable to all types of organic compound. In the nuclear industry for example, outflows from uranium processing facilities may contain a number of contaminant organic compounds such as tributyl phosphate (TBP), odourless kerosene (OK), ethylenediaminetetraacetic acid (EDTA) and citric acid. The present invention may be effective in destroying all of these compounds in aqueous solution, particularly at trace concentrations.

Embodiments of the present invention will now be described by way of the following Examples. The Examples are merely illustrative of the invention and do not limit the invention in any way.

The Catalysts Used in the Examples a) Single Oxide Catalysts

The single oxide catalysts used in these studies were $U_3O_8$ and $Co_3O_4$. The $U_3O_8$ was prepared by ramping the temperature of a starting material of uranyl nitrate in an air atmosphere to 300° C., holding for 1 hour at 300° C., ramping to 800° C. and then holding for 3 hours at 800° C. The $Co_3O_4$ was used as supplied and did not undergo any form of chemical or thermal pre-treatment.

b) Silica Supported Catalysts

A series of uranium containing catalysts, based on a system of silica supported uranium oxide has been prepared. These catalysts were prepared by an incipient wetness technique described by G C Bond, Heterogeneous Catalysis Principles and Application, Clarendon Press, Oxford, 2nd Edition 1987, p101. This procedure entailed the addition of a minimum amount of a solution containing the supported ions to the support material. Initial catalysts were 10 mol % U on $SiO_2$ prepared by the following method. $SiO_2$ was impregnated with a minimum quantity of solution of $UO_2(NO_3)_2.6H_2O$ dissolved in distilled water. Prior to use, the catalysts were calcined by a two stage process which involved heating the precursors in static air for 1 hour at 300° C. and then for a further 3 hours at 800° C. This calcination process decomposed residual nitrate on the support and formed the supported oxides.

c) Alumina Supported Catalysts

Alumina supported uranium oxide catalysts were prepared by dissolving 2.46 g (10 mole % w.r.t. alumina) of $UO_2(NO_3)_2.6H_2O$ (uranyl nitrate) and 2.94 g urea (100 mole % w.r.t. alumina) in water and adding this slowly to 5 g of alumina (Aldrich, activated, neutral, Brockman 1, std. Grade, CA 150 mesh) with strong mixing. This mix was then heated to 70–80° C. for 3 hours with occasional stirring. It was then heated at 110° C. overnight. It was calcined by heating to 300° C. (ramp rate=10° C./min), held at this temperature for 1 hour and then heated to 800° C. (same ramp rate) and held for 3 hours.

d) Uranium/Vanadium Oxide Catalysts (i) Alumina Supported Uranium/Vanadium Oxide Catalysts The metal salts uranyl nitrate (0.4922 g) (5 mol % wrt alumina) and ammonium vanadate (0.1147 g) (5 mol % wrt alumina) were dissolved in 2 ml water (0.6 ml of conc. nitric acid was added merely to help dissolve the ammonium vanadate and this was not added when other metal salts were used). The solution was then added to 2 g alumina (activated, neutral, Brockmann 1, Std Grade, ca. 150 mesh) and the mixture was stirred while heated to remove the water.

When the mixture was dry, it was heated to 300° C. at a ramp rate of 10° C. per minute and held at 300° C. for 1 hour. The temperature was then increased to 700° C. (at the same ramp rate) and held at this temperature for 3 hours. All heating was carried out in ambient air. The sample was then removed, cooled to room temperature and crushed to a powder.

(ii) Silica Supported Uranium/Vanadium Oxide Catalysts

Silica supported uranium/vanadium oxide catalysts were prepared in the same way as the corresponding alumina supported catalysts described above subject to the following differences: 2 g of silica was used in place of the 2 g alumina and the metal salts were dissolved in 6 mls water and 1 ml nitric acid prior to the addition of the silica.

(iii) Unsupported Uranium/Vanadium Oxide Catalyst

The metal salts uranyl nitrate (3 g) and ammonium metavanadate (0.0777 g, 11 mol % wrt uranium) and 2 g ammonium nitrate were dissolved in the minimum amount of water. Because ammonium metavanadate was used, a small amount of nitric acid (0.2 ml) was added to aid dissolution. The water was evaporated with stirring. The resulting mixture was powdered.

The calcination procedure was as described for the supported uranium/vanadium materials.

e) Uranium/Iron/Copper Catalysts

The metal salts uranyl nitrate (0.2788 g, 3.3 mol % wrt silica), iron nitrate (0.2244 g, 3.3 mol % wrt silica), and copper nitrate (0.1294 g, 3.3 mol % wrt silica), were dissolved in 3.8 mls of distilled water and the solution was added with stirring to 1 g silica to form a gel. The gel was dried at 110° C. overnight and then crushed to form a powder. The powder was heated in air from room temperature to 300° C. at a ramp rate of 10° C./min. It was held at 300° C. for an hour and then the temperature was increased to 650° C. at the same ramp rate. It was held at 650° C. for 3 hours and then removed from the furnace, cooled and powdered.

Catalysts comprising U/Fe and U/Cu were also prepared as described above, except that 5 mol % of the metals were used wrt silica.

f) Catalyst Characterisation

Catalysts were characterised by X-ray diffraction.

In the cases of both $U_3O_8$ and $U_3O_8$ on alumina there were no significant changes to the XRD patterns before and after use. Matching the patterns with the JCPDS powder diffraction file showed $\alpha$-$U_3O_8$ to be the only significant phase present.

Major changes were evident for the silica supported uranium catalyst in the before and after patterns. The unused catalyst was found to consist of $\alpha$-$U_3O_8$, whereas the used sample gave a good match for $UO_2$.hydrate.

The precise structure of the uranium/vanadium oxide catalysts was difficult to determine from the XRD results but the results indicate that the materials comprise mostly a mixed uranium/vanadium oxide with some discrete phases of uranium oxide and vanadium oxide.

Similarly, the structure of the uranium/iron/copper oxide catalysts could not be determined precisely but the results indicated the presence of both mixed oxide phases and discrete single oxide phases.

General Procedure for Examples 1–3

Reactions were carried out in a stirred batch reactor using aqueous hydrogen peroxide (30% w/w in water) as the oxidant unless otherwise stated. Various organic compounds were used to model problematic pollutants. A substrate mix A was prepared comprising 2.1 g of benzene, 2 g of chlorobenzene, 2 g of mixed hexanes, 250 g of water and 20 g of t-butanol. The t-butanol was added merely to aid miscibility and is not essential to the invention. Amounts of catalyst (0.1–0.2 g) and amounts of $H_2O_2$ (where used as oxidant) were added to 5 or 10 ml batches of mix A. The $H_2O_2$ used was a 30% solution in water. The reaction was then carried out for 16 hours at either ambient temperature or 50° C. as specified below. The catalysts tested were unsupported and supported $U_3O_8$ and unsupported $Co_3O_4$. In addition a control experiment using no catalyst was carried out. A Varian 3400 GC fitted with SE 56 column and a flame ionisation detector was used to detect the product. The amount of conversion of the organic compound was calculated from the peak areas of the gas chromatograph.

EXAMPLE 1

Mixture of Benzene, Chlorobenzene and Hexanes at Ambient Temperature

Batches (5 or 10 ml) of mix A were treated according to the general procedure detailed above at room temperature using $H_2O_2$ as oxidant. Separate treatments were carried out using unsupported $U_3O_8$, $SiO_2$-supported $U_3O_8$ and $Al_2O_3$-supported $U_3O_8$ as the catalysts. In addition, a control treatment was carried out without a catalyst. The results are summarised in Table 1 below.

The uncatalysed reaction showed no conversion of organic compound. The unsupported $U_3O_8$ catalyst, however, was highly active and near 100% conversion was observed. The supported $U_3O_8$ catalysts also showed high activity and were only slightly less active than the unsupported $U_3O_8$.

TABLE 1

Results for the oxidative destruction of hexanes, benzene and chlorobenzene in water using hydrogen peroxide at ambient temperature and the catalysts stated.

| Substrate | Catalyst | Oxidant | % Conversion |
|---|---|---|---|
| Mix A<br>5 mls | No Catalyst | $H_2O_2$<br>2 mls | Hexanes: 0<br>Benzene: 0<br>Chlorobenzene: 0 |
| Mix A<br>5 mls | $U_3O_8$<br>0.2 g | $H_2O_2$<br>2 mls | Hexanes: >99<br>Benzene: >99<br>Chlorobenzene: >99 |
| Mix A<br>10 mls | U on $SiO_2$<br>0.1 g | $H_2O_2$<br>1.5 mls | Hexanes: >99<br>Benzene: >90<br>Chlorobenzene: >90 |
| Mix A<br>10 mls | U on $Al_2O_3$<br>0.1 g | $H_2O_2$<br>1.5 mls | Hexanes: >95<br>Benzene: >99<br>Chlorobenzene: >99 |
| Mix A<br>5 mls | $Co_3O_4$<br>0.2 g | $H_2O_2$<br>2 mls | Hexanes: <10<br>Benzene: <10<br>Chlorobenzene: <10 |

The effectiveness of the catalysts in the method according to the present invention is especially remarkable when compared to other heterogeneous catalysts, such as $Co_3O_4$, which are known to oxidise organic compounds in the gas phase. To illustrate this, experiments were carried out with $Co_3O_4$ under identical conditions to the $U_3O_8$ experiments above but little conversion of the organic compounds was found, as shown in Table 1.

EXAMPLE 2

Mixture of Benzene, Chlorobenzene and Hexanes at 50° C.

Batches of mix A were treated according to the general procedure detailed above at 50° C. The reactions were carried out in a stainless steel (s.s) bomb. The catalyst studied was unsupported $U_3O_8$. A separate control treatment was carried out without a catalyst. The results are shown in Table 2 below.

TABLE 2

Results for the oxidative destruction of hexane, benzene, chlorobenzene in water using hydrogen peroxide at 50° C. and $U_3O_8$ as the catalyst.

| Substrate | Catalyst | Oxidant | % Conversion |
|---|---|---|---|
| Mix A<br>5 mls | No Catalyst | $H_2O_2$<br>2 mls | Hexanes: 85<br>Benzene: 84<br>Chlorobenzene: 92 |
| Mix A<br>5 mls | $U_3O_8$<br>0.2 g | $H_2O_2$<br>2 mls | Hexanes: >90<br>Benzene: >99<br>Chlorobenzene: >99 |
| Mix A<br>10 mls | $U_3O_8$<br>0.11 g | $H_2O_2$<br>1.5 mls | Hexanes: >99<br>Benzene: >99<br>Chlorobenzene: >99 |

The uncatalysed reaction showed a large increase in conversion compared with the uncatalysed reaction at room temperature, with conversions of 85%, 84% and 92% for hexanes, benzene and chlorobenzene respectively. The catalytic activity of the $U_3O_8$ on the other hand seemed to be very slightly reduced by increasing the temperature to 50° C. This may be explained by an increase in the rate of thermal $H_2O_2$ decomposition by the $U_3O_8$ relative to the rate of conversion of organic compound.

EXAMPLE 3

Mixture of Benzene, Chlorobenzene and Hexanes Using Air as Oxidant

A 10 ml batch of mix A was treated according to the method outlined above at ambient temperature except that air was used as the oxidant instead of aqueous hydrogen peroxide. The air was held in a reservoir to prevent evaporation of the organic compounds. The conversions when using unsupported $U_3O_8$ were >99% for hexanes, benzene and chlorobenzene, see Table 3 below. Thus the conversions obtained by using air as oxidant are very similar to those obtained by using hydrogen peroxide.

TABLE 3

Results for the oxidative destruction of hexanes benzene and chlorobenzene in water using air as oxidant.

| Substrate | Catalyst | Oxidant | % Conversion |
|---|---|---|---|
| Mix A | $U_3O_8$ | Air | Hexanes: >99 |
| 10 mls | 0.1 g | | Benzene: >99 |
| | | | Chlorobenzene: >99 |

EXAMPLE 4

Benzene

A mixture was prepared of 2 mls benzene, 200 mls water and 5 mts t-butanol. 0.1 g of the catalyst and 2.5 mls $H_2O_2$ (30% w/w in water) were added to 20 mls of the mixture. The reaction mixture was stirred overnight (16 hrs) at room temperature (unless otherwise stated). The results for the catalysts used are specified in Table 4.

TABLE 4

% Conversion of Benzene over Uranium Oxide Catalysts.

| Catalyst Used | % Conversion |
|---|---|
| No catalyst, RT | 0 |
| $U_3O_8$, 50° C. | >99 |
| $U_3O_8$, 50° C. RT | >99 |
| U on $Al_2O_3$, RT | >99 |
| U on $SiO_2$, RT | 99 |

All the catalysts showed good activity for the destruction of benzene. There was no significant variation between the catalysts in performance. No visual changes to any of the catalysts were observed.

EXAMPLE 5

Chlorobenzene

A mixture was prepared of 2 mls chlorobenzene, 200 mls water and 5 mls t-butanol. 0.1 g of the catalyst and 2.5 mls $H_2O_2$ (30% w/w in water) were added to 20 mls of the mixture. The reaction mixture was stirred overnight (16 hrs) at room temperature (unless otherwise stated). The results for the catalysts used are specified in Table 5.

TABLE 5

% Conversion of Chlorobenzene over Uranium Oxide Catalysts.

| Catalyst Used | % Conversion |
|---|---|
| No catalyst, RT | 0 |
| $U_3O_8$, 50° C. | >99 |
| $U_3O_8$, 50° C. RT | >99 |
| U on $Al_2O_3$, RT | >99 |
| U on $SiO_2$, RT | >99 |

All the catalysts showed good activity for the destruction of chlorobenzene. There was no significant variation between the catalysts in performance. No visual changes to any of the catalysts were observed.

The higher % conversion values for the aromatic compounds compared to other compounds such as TBP described below is probably due to the fact that aromatic compounds offer easier pathways to decomposition.

In addition, a silica supported uranium/vanadium oxide catalyst prepared as described above was tested.

The destruction of chlorobenzene using the silica supported uranium/vanadium oxide catalyst is shown in Table 6.

TABLE 6

% Conversion of chlorobenzene against time using a silica supported uranium/ vanadium oxide catalyst.

| Time (Mins.) | % Conversion |
|---|---|
| 0 | 0 |
| 40 | 57 |
| 80 | 79 |
| 160 | 82 |
| 260* | 81 |
| 360 | 90 |

*Extra $H_2O_2$ added

The uranium/vanadium oxide catalyst on silica shows very good activity for the destruction of chlorobenzene. Conversion is close to 80% after 80 mins. Conversion then essentially halts but can be seen to increase again once further peroxide is added. The reaction was left running overnight and conversion increased to 97%.

EXAMPLE 6

Mixed Hexanes

A mixture was prepared of 2 mls mixed hexanes, 200 mls water and 5 mls t-butanol. The hexanes used were obtained from the hexane fraction of petroleum. 0.1 g of the catalyst and 2.5 mls $H_2O_2$ (30% w/w in water) were added to 20 mls of the mixture. The reaction mixture was stirred overnight (16 hrs) at room temperature (unless otherwise stated) The results for the catalysts used are specified in Table 7.

TABLE 7

% Conversion of Hexanes over Uranium Oxide Catalysts.

| Catalyst Used | % Conversion |
|---|---|
| No catalyst, RT | 0 |
| $U_3O_8$, 50° C. | 65 |
| $U_3O_8$, RT. | >99 |
| U on $Al_2O_3$, RT. | 95 |
| U on $SiO_2$, RT. | 97 |

All of the catalyst showed good activity for the destruction of the hexanes. There was no loss of performance when the reaction is run at room temperature compared with 50° C., in fact, the catalysts were more active at room temperature. The lower activity at 50° C. is probably due to an increase in the rate of the hydrogen peroxide decomposition before the higher conversion could be achieved. No visual changes to any of the catalysts were observed

EXAMPLE 7

Oxygen as Oxidant

Reactions were carried out under the same conditions as in Examples 4 to 6 but no hydrogen peroxide was added. Instead, the reactions were carried out in a three necked flask, with one neck closed, a reservoir connected to one neck and the other neck used to fill the flask and reservoir with oxygen. The latter neck was then sealed, while keeping the reservoir filled with oxygen. The mix was left stirring overnight at room temperature. Results are shown in Table 8.

TABLE 8

Results for the destruction of organic compounds with oxygen as oxidant.

| Catalyst | Organic | % Conversion |
|---|---|---|
| $U_3O_8$ | Chlorobenzene | >99 |
| $U_3O_8$ | Hexanes | 97 |
| $U_3O_8$ | Benzene | 99 |
| U/Cu/Fe on $SiO_2$ | Chlorobenzene | 88 |
| None | Hexanes | 25 |

Conversion was shown to be very high as with hydrogen peroxide. Table 8 also shows the result for a silica supported uranium/copper/iron catalyst prepared as described above. This showed good conversion although it was slightly lower than the simple uranium oxides.

EXAMPLE 8
Tri-butyl Phosphate (TBP)

2 mls of TBP were dissolved in 200 mls of water. To 20 mls of this solution was added 0.1 g of catalyst and 5 mls of $H_2O_2$ (30% w/w in water). The reaction mixture was then stirred overnight for 16 hrs at room temperature (unless otherwise stated). The results are shown in Table 9.

TABLE 9

Results for the destruction of TBP.

| Catalyst Used | % Conversion |
|---|---|
| No catalyst, RT | 0 |
| $U_3O_8$, RT | 81 |
| U on $Al_2O_3$, RT | 80 |
| U on $SiO_2$, RT. | 72 |

The oxidation of TBP under the above conditions was investigated as a function of time. The analysis was carried using a Perkin Elmer Turbomass GC-MS. To avoid saturation of the column and detector by water, analysis was preceded by extraction of the organic from the aqueous phase into chloroform ( a sample of standard volume was taken at the stated time and acidified with 2–3 drops of nitric acid, a standard volume of chloroform was then added and the sample was then mixed using a vortex mixer and then centrifuged to fully separate the two phase). Results at room temperature are shown in Table 10.

TABLE 10

Results for TBP destruction for time on line study.

| Time (Mins.) | % Conversion |
|---|---|
| 0 | 0 |
| 30 | 0 |
| 90 | 22 |
| 210 | 23 |
| 330 | 31 |
| 4320 | 78 |

The results indicate that whilst TBP destruction using a $U_3O_8$ catalyst is efficient, the reaction could still be improved. Other catalysts were then tested.

A mixed metal oxide catalyst was prepared comprising a silica supported uranium/vanadium oxide catalyst. Vanadium was chosen as a suitable component because vanadium oxide is known to bring about the rapid decomposition of hydrogen peroxide. Silica was chosen as a support as silica supported catalysts are relatively easy to prepare. The uranium/vanadium oxide on silica catalyst was prepared as described above. The results for the destruction of TBP at room temperature using the uranium/vanadium oxide on silica catalyst are shown in Table 11.

TABLE 11

Results for the destruction of TBP using the uranium/vanadium oxide on silica catalyst

| Time (Mins.) | % Conversion |
|---|---|
| 0 | 0 |
| 30 | 26 |
| 60 | 48 |
| 150 | 50 |
| 210* | 52 |
| 360 | 67 |

*Extra $H_2O_2$ added

The uranium/vanadium oxide on silica catalyst showed a dramatic increase in the rate of TBP destruction as against the $U_3O_8$ catalysts. Increased effervescence of the reaction mixture upon addition of the catalyst indicated accelerated peroxide decomposition. The fall off in activity of the catalyst after 90 minutes is almost certainly due to the exhaustion of the hydrogen peroxide supply as the conversion rate rises once more the addition of extra hydrogen peroxide. As mentioned above, the silica support may undergo some hydrolysis and a better support may be alumina, titania or ceria for example.

Experiments with unsupported and alumina supported vanadium oxide, $V_2O_5$, alone (i.e. without any uranium) showed little or no conversion of TBP. This demonstrates the essential role of uranium in the present invention.

It can also be seen from the above that the efficiency of the uranium containing catalyst can be increased by careful incorporation of other elements such as vanadium. At least in the case of TBP oxidation, a uranium/vanadium mixed oxide is very efficient.

To summarise the above TBP experiments, it appears that the unsupported $U_3O_8$ and uranium oxide supported on alumina catalysts showed higher conversions than the corresponding silica supported catalyst. The silica supported uranium/vanadium oxide catalyst showed a comparable conversion (67%) in less than half the time.

EXAMPLE 9
Treatment of a Simulated Effluent

Uranium containing catalysts were also investigated for the destruction of TBP present in a simulated effluent stream. Industrial effluents contain many other contaminant species, metallic, organic and otherwise, and these other species may effect the activity of the catalysts.

The tested simulated effluent mix comprised low ppm levels of the metals iron, nickel, copper, zinc, lead and uranium, low levels of the complexants citric acid and EDTA, TBP at 50 $\mu$l/l and co-present sodium nitrate and sodium nitrite. The pH was converted to about 12 using caustic soda.

0.1 g of catalyst and 0.5 mls of 30% hydrogen peroxide was added to 20 mls of the effluent mix. The reaction was stirred for 16 hours at room temperature. The results are shown in table 12. In addition, an experiment with the uranium/vanadium oxide on silica catalyst was carried as described but using a larger amount, 3 mls ,of 30% hydrogen peroxide.

TABLE 12

Destruction of TBP present in simulated effluent

| Catalyst | % Conversion |
| --- | --- |
| None | 0 |
| $U_3O_8$ | 1 |
| U on Alumina | 1 |
| U/V on silica | 41 |
| U/V on silica (High peroxide conc.) | 78 |

The simple uranium catalysts were not very efficient for the destruction of TBP in the simulated effluent mix. This might be due to the effect of the co-present metal ions. However, the uranium/vanadium oxide catalyst was very effective, especially at the higher peroxide concentrations. A uranium/vanadium oxide based catalyst thus appears to be particularly well suited to the destruction of TBP in an industrial type effluent.

It should be noted that in other types of effluents, where the conditions and composition may be quite different from the simulated mix above, the simple uranium oxide catalysts may be more effective for TBP destruction than was found here.

The simple uranium oxide catalysts may be more effective for destroying other organic compounds than TBP. The simple uranium oxide catalysts may be more effective for destroying aromatics for example.

A uranium/vanadium oxide catalyst is particularly effective for destroying TBP.

From the foregoing results it is clear that for any particular organic compound which it is desired to destroy, a particular uranium containing catalyst may be specifically designed to efficiently catalyse the destruction of that compound. For example, in the case of destruction of benzene, chlorobenzene or hexanes, a simple uranium oxide may be very active. In the case of TBP destruction, a uranium/vanadium oxide catalyst is very active. Other potentially useful mixed metal oxide catalysts include mixed metal oxides of uranium with e.g. iron or copper.

The uranium containing catalyst may also be designed according to the conditions present in the effluent, e.g. according to the pH, the nature of the co-present metal ions and other components etc.

The embodiments discussed and described hereinabove do not limit the invention in any way. Any catalyst containing uranium may be effective for catalysing the oxidative destruction of organic compounds in aqueous solution.

In summary, the present invention provides a highly efficient method of destroying organic pollutants in aqueous effluents which can be readily carried out at ambient temperature if desired, is capable of utilising a simple oxidant such as hydrogen peroxide or air and does not suffer significantly from catalyst leaching.

What is claimed is:

1. A method of destructively oxidising an organic compound present in an aqueous solution, the method comprising oxidising the organic compound at a temperature below 100° C. in the presence of a catalyst which contains uranium.

2. A method as in claim 1 and wherein the temperature is below about 50° C.

3. A method as in claim 1 or 2 and wherein the temperature is about ambient temperature.

4. A method as in claim 1 wherein the catalyst comprises one or more oxides of uranium.

5. A method as in claim 4 and wherein the catalyst has a stoichiometry in the range from $UO_2$ to $UO_3$ inclusive.

6. A method as in claim 5 and wherein the catalyst comprises $U_3O_8$.

7. A method as in claim 1 wherein the catalyst also comprises one or more other metals.

8. A method as in claim 7 and wherein the one or more other metals are selected from the group consisting of vanadium, copper, iron and platinum.

9. A method as in claim 1 wherein the catalyst also comprises one or more other metal oxides.

10. A method as in claim 9 and wherein the one or more other metal oxides are selected from the group consisting of oxides of vanadium, copper, iron and platinum.

11. A method as in claim 1 wherein the catalyst comprises a mixed metal oxide of uranium and at least one other metal.

12. A method as in claim 11 and wherein the mixed metal oxide comprises a uranium and vanadium mixed metal oxide.

13. A method as in claim 1 wherein the catalyst is supported on a support.

14. A method as in claim 13 and wherein the support is selected from the group consisting of $SiO_2$, $Al_2O_3$, zeolites, activated carbon, $TiO_2$, $ZrO_2$, and $CeO_2$.

15. A method as in claim 1 wherein the organic compound is oxidized by hydrogen peroxide.

16. A method as in claim 1 wherein the organic compound is oxidized by air or oxygen.

17. A method as in claim 1 wherein the organic compound comprises a compound selected from the group consisting of alkanes, alkenes, alkynes, aromatics, alcohols, aldehydes, ketones, carboxylic acids, esters, ethers, amines, detergents, organic phosphates and derivatives thereof.

18. A method as in claim 17 and wherein the organic compound comprises an alkyl phosphate.

19. A method as in claim 18 and wherein the alkyl phosphate is tri-butyl phosphate.

* * * * *